United States Patent
Miodek et al.

(10) Patent No.: US 6,568,708 B2
(45) Date of Patent: May 27, 2003

(54) GAS BAG MODULE WITH GAS GUIDING MEANS

(75) Inventors: Thomas Miodek, Mutlangen (DE); Norbert Ellerbrok, Rudersberg (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/742,598

(22) Filed: Dec. 21, 2000

(65) Prior Publication Data
US 2001/0040366 A1 Nov. 15, 2001

(30) Foreign Application Priority Data
Dec. 22, 1999 (DE) .......................... 299 22 562

(51) Int. Cl.$^7$ ............................... B60R 21/28
(52) U.S. Cl. .................. 280/740; 280/742; 280/736
(58) Field of Search .................. 280/736, 730.2, 280/728.1, 731, 732, 740, 742

(56) References Cited

U.S. PATENT DOCUMENTS

| | | | | |
|---|---|---|---|---|
| 5,018,762 A | | 5/1991 | Suzuki et al. ................ 280/731 |
| 5,433,475 A | * | 7/1995 | Kokeguchi et al. .......... 280/736 |
| 5,435,595 A | * | 7/1995 | Lauritzen et al. ......... 280/728.2 |
| 5,613,704 A | | 3/1997 | White, Jr. et al. ........... 280/740 |
| 5,678,857 A | * | 10/1997 | Johnson et al. .............. 280/740 |
| 5,681,055 A | * | 10/1997 | Green et al. ............... 280/728.2 |
| 5,687,987 A | * | 11/1997 | Spencer et al. ........... 280/728.2 |
| 5,775,724 A | * | 7/1998 | Tonooka et al. ........... 280/728.2 |
| 5,967,551 A | * | 10/1999 | Newkirk et al. ............ 280/736 |
| 5,988,677 A | * | 11/1999 | Adomeit et al. ........... 280/740 |
| 6,029,996 A | * | 2/2000 | Yoshioka et al. ........... 280/740 |
| 6,050,600 A | * | 4/2000 | Yoshida ...................... 280/740 |
| 6,106,002 A | * | 8/2000 | Haesaert et al. .......... 280/728.2 |
| 6,109,649 A | * | 8/2000 | Adomeit et al. ............ 280/740 |
| 6,149,192 A | * | 11/2000 | Swann et al. ................ 280/740 |
| 6,176,512 B1 | * | 1/2001 | Rodriguez ............... 280/728.1 |
| 6,206,417 B1 | * | 3/2001 | Soderquist et al. ......... 280/736 |
| 6,209,911 B1 | * | 4/2001 | Igawa et al. ................. 280/740 |
| 6,279,944 B1 | * | 8/2001 | Wipasuramonton et al. ..... 280/730.2 |
| 6,361,067 B1 | * | 3/2002 | Varcus et al. ............... 280/729 |
| 6,371,509 B1 | * | 4/2002 | Ellerbrok et al. ........... 280/729 |

FOREIGN PATENT DOCUMENTS

| | | |
|---|---|---|
| DE | 4308387 A1 | 9/1993 |
| DE | 4442118 A1 | 6/1995 |
| DE | 2961277 U1 | 1/1997 |

\* cited by examiner

Primary Examiner—Lesley D. Morris
Assistant Examiner—L. Lum
(74) Attorney, Agent, or Firm—Tarolli, Sundheim, Covell & Tummino L.L.P.

(57) ABSTRACT

The invention relates to a gas bag module for a vehicle occupant restraint system. The gas bag module comprises an inflatable gas bag has an interior, a compressed gas source and a fabric layer arranged in the interior of the gas bag. The fabric layer guides a stream of compressed gas emerging from the compressed gas source upon inflation of the gas bag. A guiding plate is provided in the interior of the gas bag as an additional gas guiding means.

39 Claims, 2 Drawing Sheets

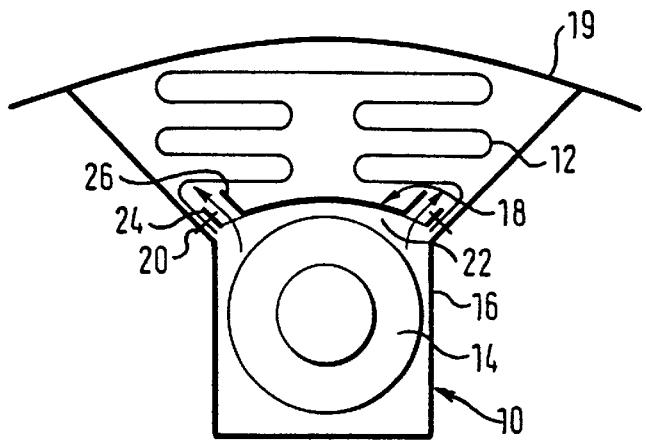
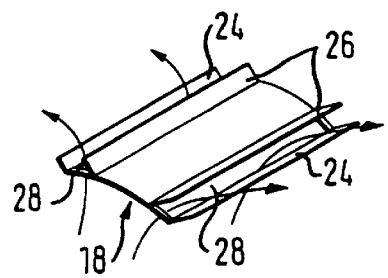
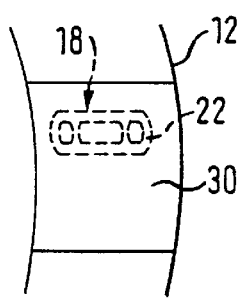
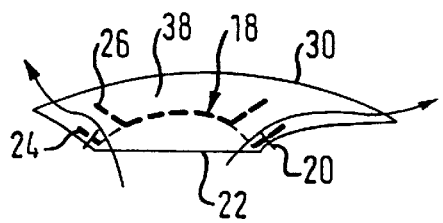
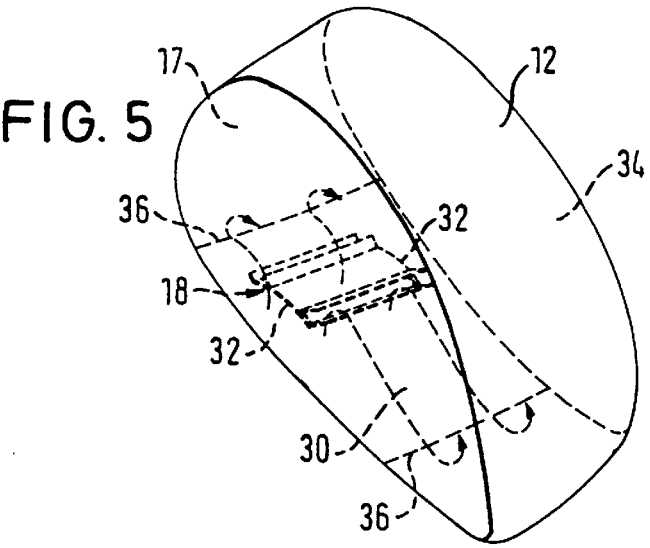

GAS BAG MODULE WITH GAS GUIDING MEANS

FIELD OF THE INVENTION

This invention relates to a gas bag module for a vehicle occupant restraint system.

BACKGROUND OF THE INVENTION

A typical gas bag module comprises an inflatable gas bag, a compressed gas source and a fabric layer arranged into he interior of the gas bag for guiding a stream of compressed gas emerging from the compressed gas source upon inflation of the gas bag. When using such modules in vehicle occupant restraint systems, in particular driver and passenger gas bags, the problem frequently occurs that during the inflation the speed of the gas bag in the direction of the vehicle occupant is to high that the same is injured due to this collision with the gas bag. This is the case above all when the vehicle occupant is bent forward or to the side.

It is known to use means for deflecting the compressed gas used for inflating the gas bag, which compressed gas normally flows out of a compressed gas source in the direction of the vehicle occupant, such that the compressed gas flowing into the gas bag chiefly flows in a plane vertical to the direction in which the gas bag emerges from a housing accommodating the same in the folded condition. Due to this measure, the gas bag first of all spreads in lateral direction, and the component of the speed in forward direction is reduced. It is important that the stream of gas out of the compressed gas source is not impeded, as the period within which the gas bag must be inflated is very short and must be observed by all means.

For deflecting the stream of compressed gas, there are used for instance layers of fabric which are fixed to the gas bag wall above the inlet opening of the gas bag, through which opening the compressed gas flows into the gas bag, and which have openings through which the gas flows into the actual gas bag. In this arrangement it is disadvantageous that upon impingement of a stream of compressed gas having a high pressure, a fabric layer is deformed such that the gas guiding means through the fabric layer is deteriorated. In addition, a certain distance of the fabric layer from the compressed gas source must be maintained if a pyrotechnical gas generator is used, as otherwise the fabric layer can be damaged by the hot gases.

It is also known to deflect the compressed gas by so-called diffusers directly upon emerging from the compressed gas source. For this purpose, the gas outlet openings of the compressed gas source are designed such that the stream of gas leaves the same in a certain preferred direction. It is also known to provide the compressed gas source with a cover with correspondingly shaped gas outlet openings. Since the compressed gas sources only have a small width as compared to the gas bag, only a short guidance of the stream of gas can be realized in this way.

BRIEF SUMMARY OF THE INVENTION

It is the object of the invention to improve the gas guiding means in a gas bag in a plane vertical to the direction in which the gas bag emerges from a housing, or in a plane parallel to the inlet opening, and to reduce the speed of propagation of the gas bag in the direction of the occupant. This is achieved in a gas bag module which comprises an inflatable gas bag having an interior, a compressed gas source and a fabric layer arranged in the interior of the gas bag. The fabric layer guides a stream of compressed gas emerging from the compressed gas source upon inflation of the gas bag. A guiding plate is provided in the interior of the gas bag as an additional gas guiding means. Accordingly, two gas guiding means are disposed in the gas bag, namely on the one hand the layer of fabric and on the other hand the guiding plate. Due to the cooperation of the two gas guiding means, the stream of compressed gas can be directed in the desired direction. The stream of hot gas under a high pressure is deflected by the guiding plate without deforming the guiding plate and without the guiding plate being damaged by the hot gas. The fabric layer subsequently guides the stream of gas over a wide area, as the fabric layer, which is flexible and can be folded together with the gas bag, can extend over a much larger expansion than the guiding plate.

A particularly good effect is achieved when the guiding plate is disposed directly above the inlet opening of the gas bag. The compressed gas is thus guided in the desired flow direction without unnecessary deviations. Moreover, this is a very space-saving arrangement for the guiding plate.

Advantageously, the guiding plate is formed integrally with a gas bag holder, for instance as fastening frame disposed in the interior of the gas bag. In this case, the guiding plate also serves to fasten the gas bag at the gas generator or some other part of the module.

Preferably, the guiding plate has lateral openings for the passage of compressed gas. Due to the lateral arrangement of the openings, the flow direction of the gas is predetermined. The deflection angle may be chosen relatively large, e.g. in the range of 90°.

To improve the gas guiding means, the guiding plate may be provided with guiding surfaces, which direct the compressed gas flowing out of the compressed gas source in the desired direction. These guiding surfaces, which may extend over the entire width of the guiding plate, guide the stream of gas in the desired direction upon emerging from the openings and reduce the expansion of the stream of gas. By changing the angles of the guiding surfaces, the guiding plate can easily be adapted to various applications, e.g. in different types of vehicle.

Advantageously, the openings and the guiding surfaces are formed at two opposite sides of the guiding plate.

The desired flow direction is predetermined by the orientation of the guiding plate, where in this context the preferred flow direction is understood to be both the direction of outflow from the openings on the one side of the guiding plate as well as the direction opposite thereto, namely the direction of outflow from the other openings of the guiding plate. The flow direction preferably lies in a plane vertical to the direction in which the gas bag emerges from a housing or in a plane parallel to the inlet opening of the gas bag.

In a preferred embodiment of the invention, the fabric layer is disposed above the guiding plate. In this way, the hot compressed gas under a high pressure first of all meets the guiding plate preferably made of metal, which directs the stream of gas through laterally disposed outlet openings as well as adjoining guiding surfaces in the desired direction without a major reduction of kinetic energy. After the gas has left the guiding surfaces, the stream of gas expands, with the flow directions of the gas deviating more and more from the preferred direction. The fabric layer, which is mounted at a suitable distance from the guiding plate and extends parallel to the guiding plate, now directs this expanded stream of gas, whose kinetic energy and temperature are already distinctly smaller than at the moment of exit from the compressed gas source, further in the desired direction and guides the same over a much larger extension than that of the guiding plate in lateral direction. At the ends of the fabric layer, the stream of gas flows around the same, and the gas escapes into the gas bag, which due to the guidance of the compressed gas expands more in a lateral direction and less in the direction of the vehicle occupant.

The guidance of the gas by the fabric layer is particularly effective when the fabric layer is fixed to the gas bag walls in such a way that it extends parallel to the flow direction. It can thus be ensured that the flow cross-section for the compressed gas is large enough so as not to impede the flow of compressed gas.

In particular for passenger gas bags it is advantageous when the fabric layer is disposed asymmetrically with respect to the guiding plate. Since passenger gas bags often have an asymmetrical shape, e.g. a smaller extension upwards in the direction of the roof or the windshield than downwards in the direction of the legs of the vehicle occupant, it is recommended to adapt the fabric layer for the guidance of the gas to the shape of the gas bag.

In another advantageous embodiment of the invention the gas bag has a covering part partly parallel to the guiding plate, where the fabric layer is fixed to the covering part in order to provide for a specific control of the gas flow. Fixing is preferably effected via arc-shaped seams.

To ensure that the compressed gas can flow from the volume below the fabric layer into the interior of the actual gas bag, openings are provided which are preferably formed by portions of the fabric layer which are not fixed to the gas bag. In particular in conjunction with an asymmetrically arranged fabric layer, these openings forming a flow connection from the volume disposed below the fabric layer to the interior of the gas bag should advantageously have different sizes.

BRIEF DESCRIPTION OF THE DRAWINGS

FIG. 1 shows an inventive gas bag module in a cross-section;

FIG. 2 shows a perspective view of a guiding plate as it is used in the inventive gas bag module;

FIG. 3 shows a top view of a segment of an inventive gas bag module;

FIG. 4 shows a cross-section through the guiding plate and the fabric layer of an inventive gas bag module;

FIG. 5 shows a perspective view of an inventive gas bag module with an inflated gas bag;

DETAILED DESCRIPTION OF THE PREFERRED EMBODIMENT

Figure 6:
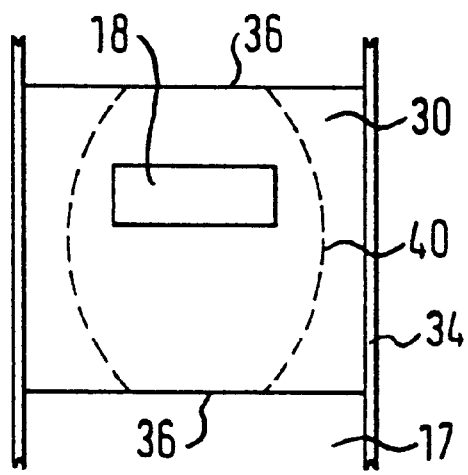
FIG. 6 shows a solution for fixing an inventive fabric layer.

FIG. 1 shows a first embodiment of an inventive gas bag module 10. The gas bag module 10 comprises a gas bag 12, which is preferably formed of a covering part 17 and two side walls 34, a compressed gas source 14, preferably a pyrotechnical gas generator, in particular a tubular gas generator, and a gas generator mount 16, in which the compressed gas source 14 is fixed. In the gas bag 10 a guiding plate 18 is disposed. This guiding plate 18 is shown in detail in FIG. 2. In the non-inflated condition, the gas bag 12 may be disposed folded on the guiding plate 18. The gas bag module 10 is accommodated for instance behind a cover 19 in the dashboard of a vehicle.

The gas bag 10 is fixed by means of fasteners 20, e.g. screws, to the outer edges of the guiding plate 18, which thus also serves as gas bag holder or fastening frame for fixing the gas bag 12 at the gas generator mount 16 and/or at a vehicle-fixed component. The guiding plate 18 thus replaces a conventional gas bag holder inserted in the gas bag. The component may also be configured as a housing for the gas bag 12.

The guiding plate 18 is disposed directly above the inlet opening 22 of the gas bag 12 and the gas generator 14.

FIG. 2 shows an inventive embodiment of the guiding plate 18. The guiding plate 18 preferably consists of a slightly bent, approximately rectangular sheet. The long sides of the sheet are bent against the direction of curvature, so as to form first guiding surfaces 24. In addition, the guiding plate 18 has two further guiding surfaces 26, which can be made for instance by punching out and bending up the corresponding parts of the guiding plate 18. In this way, two slot-shaped openings 28 are obtained, which extend almost along the entire length of the guiding plate 18. Other forms, materials and production methods are of course also conceivable for the guiding plate.

At a distance above the guiding plate 18 a fabric layer 30 is disposed, which is shown in FIGS. 3 and 4. The fabric layer 30 extends in a plane parallel to the inlet opening 22 and in all directions has a larger expansion than the guiding plate 18. At the walls 34 of the gas bag 12, which are parallel to the narrow sides 32 of the guiding plate 18, the fabric layer 30 is fixed by suitable means, e.g. seams. The fabric layer 30 is disposed such that at its sides parallel to the openings 28 of the guiding plate 18 openings 36 to the remaining gas bag volume are formed. In general, the fabric layer 30 is arranged such that its sides fixed to the gas bag 12 extend parallel to the stream of gas and the open sides extend vertical thereto. The openings 36 formed by the open sides may have different sizes.

FIG. 5 shows the spatial arrangement of a guiding plate 18 as well as a fabric layer 30 in a gas bag 12 in accordance with the invention, with the gas bag 12 inflated.

The function of the inventive gas guiding means 24, 26, 30 is as follows. When the vehicle occupant restraint means is activated in the case of an accident in the known way, compressed gas flows out of the gas generator 14, in order to inflate the gas bag 12. The compressed gas first of all impinges on the underside of the guiding plate 18 and flows along the same to the openings 28. Due to the lateral arrangement of the openings 28 of the guiding plate 18, the compressed gas enters the volume 38 below the fabric layer 30 already with a certain preferred direction. The stream of compressed gas is indicated in the Figures by means of arrows. The guiding surfaces 24, 26 guide the compressed gas further in this preferred direction. The entire compressed gas for inflating the gas bag 12 enters the volume below the fabric layer 30 in this preferred direction, which is approximately vertical to the direction in which the gas bag 12 emerges from a housing.

Upon leaving the guiding surfaces 24, 26 the stream of gas expands. The fabric layer 30 mounted at a suitable distance from the guiding plate 18 now directs this expanded stream of gas, whose kinetic energy and temperature are already distinctly lower than at the moment of exit from the compressed gas source, into the desired direction and guides the same over a much larger extension than that of the guiding plate 18 in lateral direction. At those ends of the fabric layer 30 which are not fixed, the stream of gas flows around the same, and through the openings 36 thus formed the gas escapes into the gas bag 12, which due to the guidance of the compressed gas expands more in a lateral direction and less in the direction of the vehicle occupant. The invention thus combines the advantages of a diffuser with those of a fabric layer for guiding the compressed gas.

The distance between the fabric layer 30 and the guiding plate 18 is chosen such that the stream of compressed gas is guided in the desired direction without impeding the flow of the gas.

Depending on the shape and the intended use of the gas bag 12, the fabric layer 30 may be designed differently. In the case of a passenger gas bag as represented in FIG. 5, the fabric layer 30 for instance has an asymmetrical arrangement with respect to the guiding plate 18. Since the arrangement of the inlet opening 22 of the gas bag 12 depends, among other things, on the vehicle geometry and can therefore not be chosen freely, it is not always possible to symmetrically place this inlet opening 22 in the gas bag 12. This disadvantage may be compensated by the arrangement of the fabric layer 30, so that filling the gas bag 12 is optimized.

Figure 7:
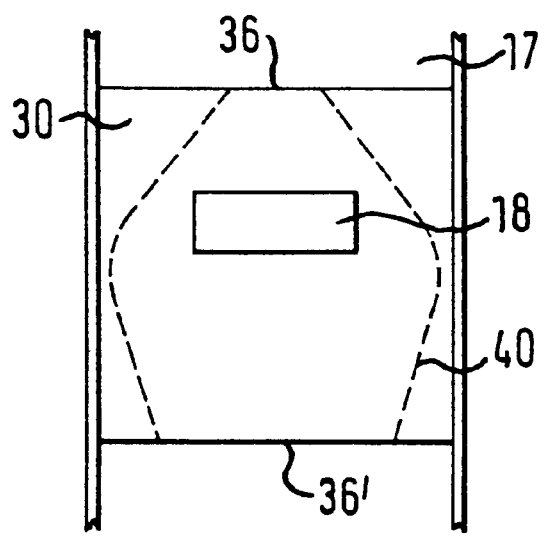
FIG. 7 shows a further solution for fixing an inventive fabric layer.

In a second embodiment of the invention, which differs from the first embodiment only by the arrangement of the fabric layer in the gas bag, the fabric layer 30 is fixed to the covering part 17 for instance by a seam 40 (see FIGS. 6, 7). FIGS. 6 and 7 illustrate ways of fixing the fabric layer 30. In FIG. 6, the fabric layer 30 is fixed to the covering part 17 of the gas bag 12 via two arc-shaped seams 40, with two openings 36 of the same size being formed towards the interior of the gas bag.

In FIG. 7, the seams 40 extend such that one of the openings 36' is larger than the other opening 36. In this way, the inflation behavior of an asymmetrically cut gas bag can be improved.

The invention is by no means restricted to the use in passenger gas bags, and other vehicle occupant restraint systems having inflatable gas bags can also be equipped therewith.

What is claimed is:

1. A gas bag module for a vehicle occupant restraint system, said gas bag module comprising an inflatable gas bag having an interior, a compressed gas source and a fabric layer arranged in said interior of said gas bag, said fabric layer guiding a stream of compressed gas emerging from said compressed gas source upon inflation of said gas bag, a guiding plate being provided in said interior of said gas bag as an additional gas guiding means.

2. The gas bag module as claimed in claim 1, wherein said guiding plate is disposed directly above an inlet opening, of said gas bag, for compressed gas.

3. The gas bag module as claimed in claim 1, wherein said guiding plate is formed integrally with a gas bag holder.

4. The gas bag module as claimed in claim 1 wherein openings for the passage of compressed gas are provided on at least one side of said guiding plate.

5. The gas bag module as claimed in claim 1 wherein said guiding plate is provided with guiding surfaces for guiding compressed gas flowing out of said compressed gas source.

6. The gas bag module as claimed in claim 1 wherein said fabric layer is disposed above said guiding plate.

7. The gas bag module as claimed in claim 1 wherein said guiding plate and said fabric layer are disposed one behind the other in a flow direction.

8. The gas bag module as claimed in claim 1 wherein said fabric layer is asymmetrically located with respect to said guiding plate.

9. The gas bag module as claimed in claim 1 wherein said gas bag has walls and said fabric layer has a plurality of sides, said fabric layer being fixed to said gas bag walls at at least one of said sides, the side of said fabric layer fixed to said gas bag wall extending parallel to a flow direction of said stream of compressed gas emerging from said compressed gas source.

10. The gas bag module as claimed in claim 1 wherein said gas bag has a portion extending parallel to said guiding plate, said fabric layer being fixed to said portion.

11. The gas bag module as claimed in claim 1 wherein at least two openings are provided, which form a flow connection from a volume disposed below said fabric layer to said interior of said gas bag, these openings having different sizes.

12. A gas bag module for a vehicle occupant restraint system, said gas bag module comprising an inflatable gas bag having an interior, a compressed gas source and a fabric layer arranged in said interior of said gas bag, said fabric layer guiding a stream of compressed gas emerging from said compressed gas source upon inflation of said gas bag, a guiding plate being provided in said interior of said gas bag as an additional gas guiding means, the guiding plate being fixed relative to the compressed gas source.

13. The gas bag module as claimed in claim 12 wherein the guiding plate has openings through which the gas flows.

14. The gas bag module as claimed in claim 12, wherein said guiding plate is disposed directly above an inlet opening of said gas bag for compressed gas.

15. The gas bag module as claimed in claim 12, wherein said guiding plate is formed integrally with a gas bag holder.

16. The gas bag module as claimed in claim 12, wherein openings for a passage of compressed gas are provided on at least one side of said guiding plate.

17. The gas bag module as claimed in claim 12 wherein said guiding plate is provided with a guiding surface for guiding compressed gas flowing out of said compressed gas source.

18. The gas bag module as claimed in claim 12 wherein said fabric layer is disposed above said guiding plate.

19. The gas bag module as claimed in claim 12 wherein said guiding plate and said fabric layer are disposed one behind the other in a flow direction.

20. The gas bag module as claimed in claim 12 wherein said fabric layer is asymmetrically located with respect to said guiding plate.

21. The gas bag module as claimed in claim 12 wherein said gas bag has walls and said fabric layer has a plurality of sides, said fabric layer being fixed to said gas bag walls at at least one of said sides, a side of said fabric layer fixed to said gas bag wall extending parallel to a flow direction of said stream of compressed gas emerging from said compressed gas source.

22. The gas bag module as claimed in claim 12 wherein said gas bag has a portion extending parallel to said guiding plate, said fabric layer being fixed to said portion.

23. The gas bag module as claimed in claim 12 wherein at least two openings are provided which form a flow connection from a volume disposed below said fabric layer to said interior of said gas bag, the openings having different sizes.

24. The gas bag module as claimed in claim 12 further including least one fastener fastening the gas bag to outer edges of the guiding plate.

25. A gas bag module for a vehicle occupant restraint system, said gas bag module comprising an inflatable gas bag having an interior, a compressed gas source and a fabric layer arranged in said interior of said gas bag, said fabric layer guiding a stream of compressed gas emerging from said compressed gas source during inflation of said gas bag, a guiding plate being provided in said interior of said gas bag as an additional gas guiding means, the guiding plate having openings through which the gas flows, said guiding plate being provided with guiding surfaces for guiding a stream of compressed gas flowing out of said compressed gas source, said guiding surfaces extending away from a base plate of said guiding plate towards the interior of said gas bag.

26. The gas bag module as claimed in claim 25 wherein the guiding plate is fixed relative to the compressed gas source.

27. The gas bag module as claimed in claim 25, wherein said guiding plate is disposed directly above an inlet opening of said gas bag for compressed gas.

28. The gas bag module as claimed in claim 25, wherein said guiding plate is formed integrally with a gas bag holder.

29. The gas bag module as claimed in claim 25, wherein openings for the passage of compressed gas are provided on at least one side of said guiding plate.

30. The gas bag module as claimed in claim 25 wherein said fabric layer is disposed above said guiding plate.

31. The gas bag module as claimed in claim 25 wherein said guiding plate and said fabric layer are disposed one behind the other in a flow direction.

32. The gas bag module as claimed in claim 25 wherein said fabric layer is asymmetrically located with respect to said guiding plate.

33. The gas bag module as claimed in claim 25 wherein said gas bag has walls and said fabric layer has a plurality of sides, said fabric layer being fixed to said gas bag walls at at least one of said sides, a side of said fabric layer fixed to said gas bag wall extending parallel to a flow direction of said stream of compressed gas emerging from said compressed gas source.

34. The gas bag module as claimed in claim 25 wherein said gas bag has a portion extending parallel to said guiding plate, said fabric layer being fixed to said portion.

35. The gas bag module as claimed in claim 25 wherein at least two openings are provided which form a flow connection from a volume disposed below said fabric layer to said interior of said gas bag, the openings having different sizes.

36. The gas bag module as claimed in claim 25 further including least one fastener fastening the gas bag to outer edges of the guiding plate.

37. The gas bag module as claimed in claim 25, wherein the guiding plate comprises the base plate with bent portions, the bent portions comprising said guiding surfaces.

38. The gas bag module as claimed in claim 25, wherein said guiding surfaces diverge as said guiding surfaces extend at an angle away from and relative to said base plate and towards the interior of said gas bag, the divergence being predetermined at assembly of the gas bag module.

39. The gas bag module as claimed in claim 25, wherein the guiding surfaces define said openings in said guiding plate.

* * * * *